United States Patent
Macbeth et al.

(10) Patent No.: US 6,504,692 B1
(45) Date of Patent: Jan. 7, 2003

(54) AFCI DEVICE WHICH DETECTS UPSTREAM AND DOWNSTREAM SERIES AND PARALLEL ARC FAULTS

(75) Inventors: Bruce F. Macbeth, Syracuse, NY (US); Thomas N. Packard, Syracuse, NY (US); Jeffrey C. Richards, Baldwinsville, NY (US); James P. Romano, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 11 days.

(21) Appl. No.: 09/828,622

(22) Filed: Apr. 6, 2001

Related U.S. Application Data

(60) Provisional application No. 60/195,168, filed on Apr. 6, 2000.

(51) Int. Cl.[7] .................................................. H02H 9/08
(52) U.S. Cl. ........................................................ 361/42
(58) Field of Search .............................. 361/42, 43, 44, 361/45, 46, 47, 48, 49, 50, 69, 93.1, 94; 324/536, 924

(56) References Cited

U.S. PATENT DOCUMENTS

| 5,682,101 A | * | 10/1997 | Brooks et al. |
| 5,834,940 A | * | 11/1998 | Brooks et al. |
| 5,963,406 A | * | 10/1999 | Neiger et al. |
| 6,088,205 A | * | 7/2000 | Neiger et al. |

* cited by examiner

Primary Examiner—Edward H. Tso
(74) Attorney, Agent, or Firm—Wall Marjama & Bilinski

(57) ABSTRACT

Downstream series and parallel arcing in AC power lines is determined by using a detector and microprocessor to detect characteristic di/dt behavior received from a current sensor through which the power lines pass. When downstream parallel arcing is detected, the microprocessor uses a speedy algorithm which cannot be used to detect series arcing. Upstream series arcing is detected by sensing a flat voltage portion of the line voltage. Upstream parallel arcing is detected by sensing a voltage spike followed by a voltage flat portion of the line voltage. When upstream parallel arcing is detected, the microprocessor is temporarily shut off to avoid false tripping.

48 Claims, 8 Drawing Sheets

AFCI DEVICE WHICH DETECTS UPSTREAM AND DOWNSTREAM SERIES AND PARALLEL ARC FAULTS

CROSS-REFERENCE TO RELATED APPLICATIONS

This application claims priority from U.S. Provisional Application Ser. No. 60/195,168 filed Apr. 6, 2000 and entitled AFCI DEVICE WHICH DETECTS UPSTREAM AND DOWNSTREAM SERIES ARC FAULTS, PARALLEL DOWNSTREAM ARC FAULTS, WITH VARIOUS NOISE REJECTION CIRCUITRY, incorporated herein by reference.

FIELD OF THE INVENTION

The invention pertains to the field of arc fault detectors and interrupters, and in particular, to an arc fault interrupter which detects and interrupts upstream and downstream series arcing and downstream parallel arcing, while detecting upstream parallel arcing in order to prevent tripping.

BACKGROUND OF THE INVENTION

A percentage of fires each year are caused by electrical branch circuit wiring arcing faults involving currents below the trip level of a conventional circuit breaker or OCPD (over current protection device) as well as below the handling rate of the breaker. Basic overcurrent protection afforded by circuit breakers is designed to prevent $I^2R$ heating of the wiring in the electrical distribution system, caused by circuit overloading or line-to-line faults, and not necessarily arcing faults. A true short circuit is a rarity in an electrical system. In fact, it is more accurate to think of electrical faults as having some level of impedance, such as a high impedance arc fault (low current) or a low impedance fault (high current). Many electrical faults begin as high impedance breakdowns between the line and neutral conductors or to the ground wire or device components. AFCI (Arc Fault Circuit Interrupter) technology affords protection from conditions that may not necessarily be an immediate threat but could become hazardous if left unattended.

In order to start a fire, three elements must be present fuel, oxygen(air), and energy to ignite the fuel. Arcing is defined as a luminous discharge of electricity across an insulating medium. The electrical discharge of an arc can reach temperatures of several thousand degrees Celsius. Arcing produces sufficient energy to reach the ignition point of nearby combustible material(s) before a circuit breaker can respond. Arc detection is an enhancement to thermal magnetic overload detection typically used in circuit breakers or OCPD's, which alone may not detect and respond to arc faults.

A number of devices for detecting arc faults and methods of detection have been used in the past. These include using E and B field arc sensors, detecting the amplitude of the rate of change of current signals when an arc fault occurs, using non-overlapping band pass filters to detect white noise characteristic of arcs, and utilizing the high frequency components (RF) of arcing waveforms to detect arcing faults. While some of these techniques are more or less effective than others, they require relatively sophisticated arc sensors and circuits. Heretofore, most arc detection circuits have been incorporated in circuit breakers.

"A-type" arc faults are those in which the arc occurs across a break in the line or neutral conductors or at a loose terminal in a branch circuit of a distribution network. The conductors are carrying current to a load derived from the line voltage. The arc could likewise occur as a break or at a loose terminal associated with an extension cord deriving power from line voltage, thereby completing the circuit to the load. Since the current through the A-type fault is limited by the impedance of the load itself, since the fault is in series with the load, an A-type fault is also known as a "series fault."

B-type" arc faults are a second arcing condition that must be detected and interrupted by a combination outlet device. In a B-type fault, the arc occurs across two conductors in the branch circuit or extension cords plugged into it, at a site where the insulating media separating the two conductors has been compromised. The arc may occur across the line and neutral conductors or the line and ground conductors, or in the case of reverse polarity where the line voltage is reverse-polarized, between the neutral and ground conductors. The current through the B-type fault is not limited by the impedance of the load, but rather by the available current from the supply established by the impedance of the conductors and terminals between the source of line voltage and the position of the parallel fault, i.e., the conductive members carrying the fault current. Since B-type faults are effectively across the line, they are also known as "parallel faults."

There is a need for simple economical arc fault detectors that can be included in wiring devices such as duplex receptacles, multi-outlet strips, or in-line devices, and that offer the same protection as an arc fault detector incorporated in a circuit breaker but at lower cost. There is a need for an arc fault circuit detector in wiring devices that can be provided at a reduced cost compared with arc fault circuit detecting circuit breakers comparable to the reduction in cost between ground fault interrupting receptacles and ground fault interrupting circuit breakers.

SUMMARY OF THE INVENTION

Briefly stated, downstream series and parallel arcing in AC power lines is determined by using a detector and microprocessor to detect characteristic di/dt behavior received from a current sensor through which the power lines pass. When downstream parallel arcing is detected, the microprocessor uses a speedy algorithm which cannot be used to detect series arcing. Upstream series arcing is detected by sensing a flat voltage portion of the line voltage. Upstream parallel arcing is detected by sensing a voltage spike followed by a voltage flat portion of the line voltage. When upstream parallel arcing is detected, the microprocessor is temporarily shut off to avoid false tripping.

According to an embodiment of the invention, an arc fault circuit interrupter operatively connected between a line side and a load side of an AC electric power distribution system includes first sensing means for sensing a line current in the AC electric power distribution system and producing a di/dt signal; circuit means for processing the di/dt signal and producing an output; tripping means for interrupting power to the load; processing means for processing the output to determine an existence of a downstream arc fault, the processing means including a normal algorithm and a speedy algorithm for processing the output, the processing means sending a trip signal to the tripping means upon determination of the downstream arc fault; second sensing means for sensing a sinusoidal load current of a fundamental frequency of the power distribution system above a first predetermined level; circuit means, responsive to the second sensing means, for initiating the speedy algorithm within the processing means; circuit means for detecting an existence of an upstream series arc, and upon detection of the upstream series arc, for signaling the processing means to send the trip signal to the tripping means; and circuit means for detecting an existence of an upstream parallel arc, and upon detection of the upstream parallel arc, for deactivating the processing means so that the processing means does not send the trip signal to the tripping means.

According to an embodiment of the invention, an arc fault circuit interrupter operatively connected between a line side and a load side of an AC electric power distribution system includes tripping means for interrupting power to the load; first sensing means for sensing upstream arc faults in the AC electric power distribution system and producing an output; processing means for processing the output to determine an existence of a downstream arc fault, the processing means sending a trip signal to the tripping means upon determination of the downstream arc fault; first circuit means for detecting an existence of an upstream series arc, and upon detection of the upstream series arc, for signaling the processing means to trip the tripping means; and second circuit means for detecting an existence of an upstream parallel arc, and upon detection of the upstream parallel arc, for deactivating the processing means so that the processing means does not send the trip signal to the tripping means.

According to an embodiment of the invention, an arc fault circuit interrupter operatively connected between a line side and a load side of an AC electrical power distribution system includes tripping means for interrupting power to the load; sensing means for sensing arc faults in the AC electrical power distribution system and producing an output; processing means for processing the output to determine an existence of a downstream arc fault, the processing means sending a trip signal to the tripping means upon determination of the downstream arc fault; first circuit means for detecting an existence of an arc fault signal, and upon detection of the arc fault signal, for signaling the processing means to trip the tripping means; and second circuit means for detecting an existence of upstream arc mimicking noise, and upon detection of the upstream arc mimicking noise, for deactivating the processing means so that the processing means does not send a trip signal to the tripping means.

According to an embodiment of the invention, an arc fault circuit interrupter operatively connected between a line side and a load side of an AC electric power distribution system includes tripping means for interrupting power to the load; sensing means for sensing arc faults in the AC electric power distribution system and producing an output; processing means for processing the output to determine an existence of a downstream arc fault, the processing means sending a trip signal to the tripping means upon determination of the downstream arc fault; first circuit means for detecting an existence of arc fault signal, and upon detection of the arc fault signal, for signaling the processing means to trip the tripping means; and filter means located upstream of the sensing means; wherein the filter means prevents arc mimicking noise on the AC electric power distribution system from signaling the processing means to trip the tripping means.

According to an embodiment of the invention, an arc fault circuit interrupter operatively connected between a line side and a load side of an AC electric power distribution system includes tripping means for interrupting power to the load; first sensing means for sensing a line current in the AC electric power distribution system and producing a di/dt signal; circuit means for processing the di/dt signal and producing an output; processing means for processing the output to determine an existence of a downstream arc fault, the processing means including a normal algorithm and a speedy algorithm for processing the output, the processing means sending a trip signal to the tripping means upon determination of the downstream arc fault; second sensing means for sensing a sinusoidal load current of a fundamental frequency of the power distribution system above a first predetermined level; and circuit means, responsive to the second sensing means for initiating the speedy algorithm within the processing means when the first predetermined level is exceeded for a predetermined interval, wherein the second sensing means includes a shunt resistance in series with the line.

According to an embodiment of the invention, an arc fault circuit interrupter operatively connected between a line side and a load side of an AC electric power distribution system includes tripping means for interrupting power to the load; sensing means for sensing a ground fault current in the AC electric power distribution system; wherein the sensor is connected to a Zener diode, the Zener diode being connected to the tripping means, in which sensed ground fault current by the first sensing means produces a signal which breaks over the Zener diode which in turn activates the tripping means.

According to an embodiment of the invention, an arc fault circuit interrupter operatively connected between a line side and a load side of an AC electric power distribution system includes tripping means for interrupting power to the load; sensing means for sensing a line current in the AC electric power distribution system, the sensing means including a toroidal transformer in which the line is a primary winding and a secondary winding produces a di/dt signal; circuit means for processing the di/dt signal and producing an output; processing means for processing the output to send a trip signal to the tripping means upon detection of the di/dt signal; circuit means for determining a magnitude of the di/dt signal; and high impedance means responsive to the magnitude, wherein a plurality of di/dt signals greater than a pre-established threshold cause the high impedance means to open, thereby blocking the plurality of di/dt signals from the processing means, and unloading the secondary winding of the sensor.

DETAILED DESCRIPTION OF THE PREFERRED EMBODIMENT

Figures 1, 1A:
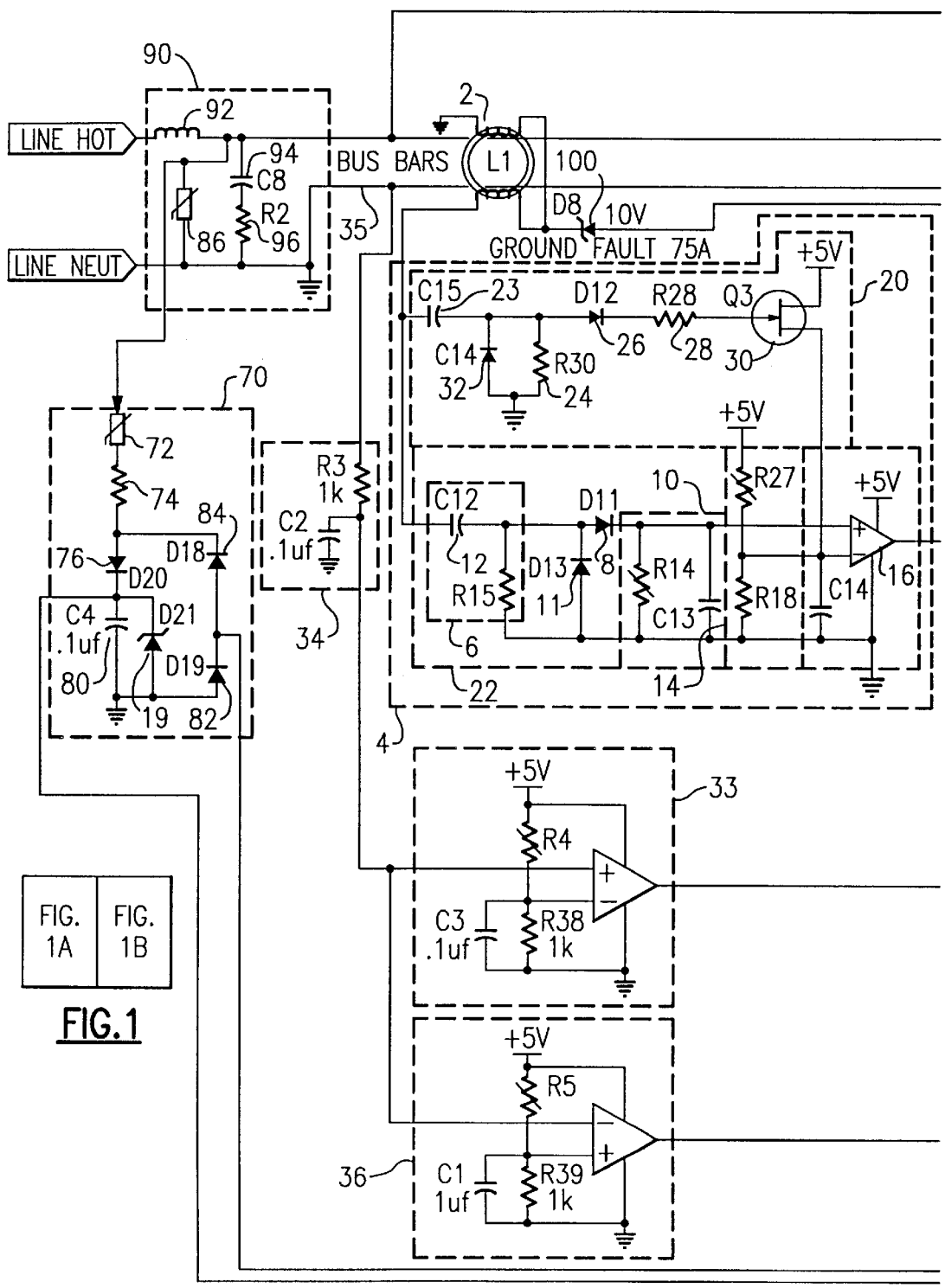
FIGS. 1, 1A and 1B show a schematic circuit diagram of an embodiment of the present invention.
Figure 1B:
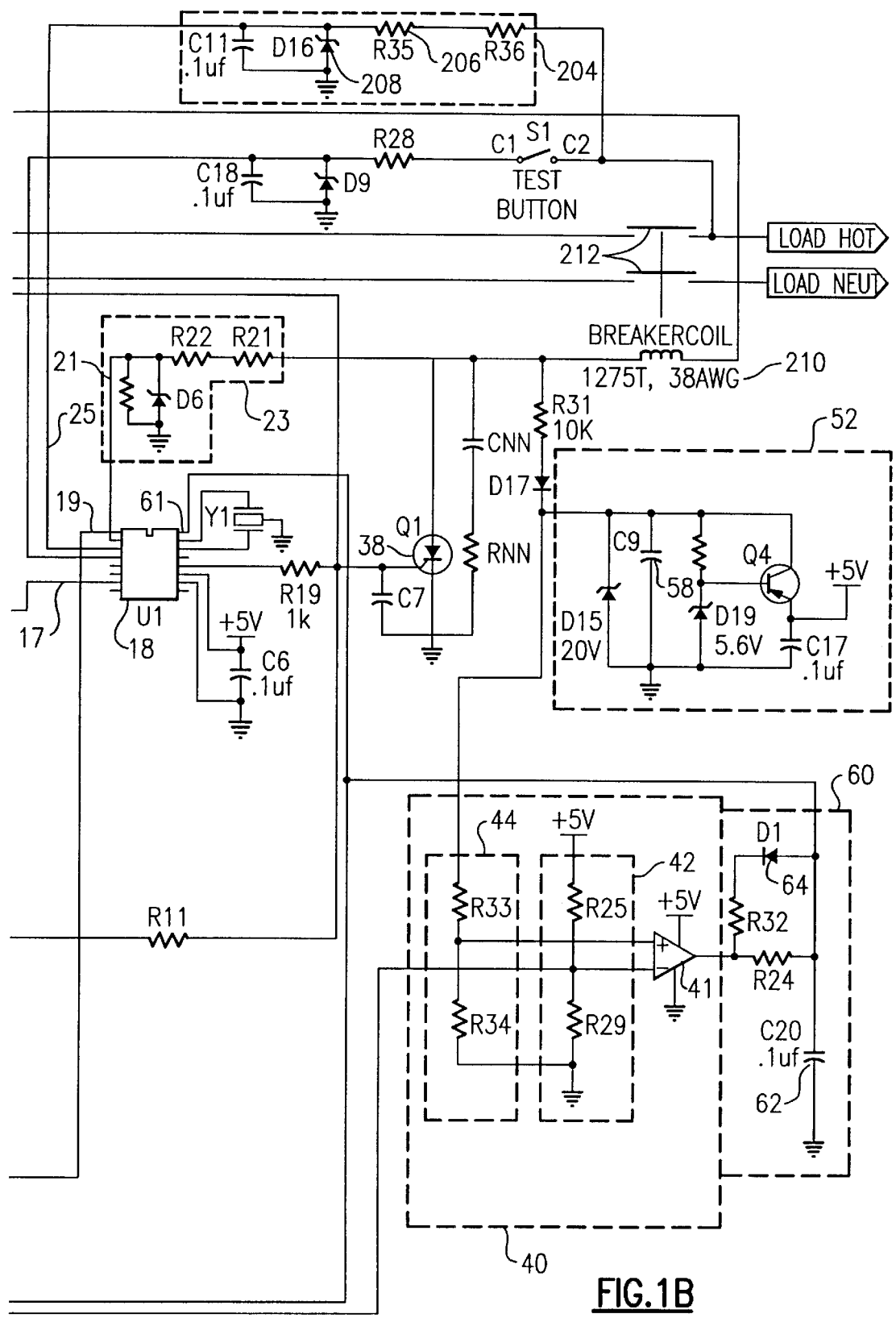

Referring to FIG. 1, a sensor 2 is shown which detects the di/dt of the line current as described in U.S. patent application Ser. No. 09/518,528 filed on Mar. 4, 2000 and entitled TWO WINDING RESONANT ARC FAULT SENSOR WHICH BOOSTS ARC FAULT SIGNALS WHILE REJECTING ARC MIMICKING NOISE, incorporated herein by reference. A block 4 shows the di/dt processing circuit. When a step in line current occurs from the start of a downstream arc fault, a pulse occurs on the output of sensor 2 which contains a pulse followed by a damped ring. The ringing pulse is applied to a sub-block 22 of block 4, where the ringing pulse first passes through a high pass filter 6 which strips off the lower frequency signal generated by switching power supplies and the like. High pass filter 6 preferably includes a capacitor 12 and a resistor R15. After passing through filter 6, the positive portions of the ringing pulse are rectified by a diode 8 and filtered by an integrator 10. An optional diode 11 preferably conducts the negative portions of the ringing pulse back through capacitor 12 of filter 6, charging capacitor 12 in the opposite direction to the positive ringing pulses. The combination of diode 11 and capacitor 12 has the effect of preferably doubling the charge pumped into an integrator 10, as each positive going ring peak pushes the previously stored negative charge held in capacitor 12, from the last negative ring, along with the newly arriving positive charge, into integrator 10. Doubling the charge allows the circuit to detect a smaller pulse coming off sensor 2, i.e., it increases the minimum sensitivity of a comparator 16 to sensor 2. When the voltage across the integrator 10 rises above the threshold voltage set by a divider 14, preferably around 500 mV, comparator 16 switches high, delivering a pulse to an input 17 of a microprocessor 18.

Block 4 also contains a signal sub-block 20 which acts as a signal blocker for undesired di/dt pulses. Steps in current which produce large ringing pulses, such as from a light dimmer, pass through a capacitor 23, which forms a high pass filter together with a resistor 24, are then rectified by a diode 26 and applied to the gate of an FET 30 via a decoupling resistor 28. An optional diode 32 preferably acts to charge capacitor 23 during the minus ring excursions, allowing doubling of the charge delivered to the gate of FET 30 as described in sub-block 22. When a pulse of sufficient magnitude occurs at the output of sensor 2, FET 30 is caused to conduct, pulling the threshold voltage from divider 14 to comparator 16 high and disabling comparator 16, keeping it from responding to the same pulse arriving into sub-block 22. In this way, the sensitivity of sub-block 22 can be high, while not being overwhelmed by a large pulse arriving from sensor 2. By use of an FET switch in sub-block 20, the impedance presented to sensor 2 is high and does not load down the signal for normal operation arc fault sensing. This type of blocker is superior to a simple Zener clamp across the output of sensor 2 as the Zener presents low impedance to the clamped ring arriving from sensor 2. The low impedance causes a clamp current which acts to store energy in the sensor 2 core and to stretch out the pulse width, negating the effect of the clamping action on the charging of integrator 10.

For downstream series arc fault current, which current is limited by the load to below the circuit rating, the arc fault signal path is by way of the di/dt signal from sensor 2, which is processed by block 4 to cause shifting of the output of comparator 16 into a pulse width dependent on both the duration of the arc di/dt noise of the arc fault and also on the magnitude of arc starting and stopping steps. This is well described in U. S. patent application Ser. No. 09/788,206 entitled ARC FAULT CIRCUIT INTERRUPTER RECOGNIZING ARC NOISE BURST PATTERNS filed on Feb. 16, 2001, incorporated herein by reference. Microprocessor 18 processes the pulses arriving from comparator 16 for pulse patterns indicative of series arcing faults, or low level parallel arc faults, and on signature recognition issues a firing command to an SCR 38. SCR 38 activates a solenoid 210 which releases a plurality of contacts 212 into the open state interrupting the load current by action of a mouse trap type mechanism.

Downstream arc faults to ground cause sensor 2 core saturation pulses across a winding as described in U.S. patent application Ser. No. 09/518,528 referred to above. This causes a Zener diode 100 to conduct. Zener diode 100 is connected to the gate of trip SCR 38, which acts to immediately trip out the AFCI for these types of faults without invoking the microprocessor 18 software.

For downstream parallel arc fault currents, which are above the circuit rating because they are not constrained by the load, the AFCI design of FIG. 1 uses a buss bar 35 as a second current sensor for detecting 60 Hz sinusoidal load current of a predetermined peak level above the circuit rating, preferably 50 A and greater, for causing microprocessor 18 to shift into an alternate algorithm which processes the arc di/dt information arriving from sensor 2 in a speedy manner with reduced arc signature requirements. The complicated arc signature algorithm required for arc fault currents below the circuit breaker rating, which is needed to discriminate arc fault signatures from normal operation arc fault mimicking signals, is not required at higher arc fault currents and becomes a hindrance. Some loads, such as a light dimmer starting up a tungsten load, produce an inrush current which is above 50 A peak, accompanied by the di/dt of the dimmer as the load current repeatedly steps into conduction somewhere during the half cycle. The peak level of this current decays quickly when compared to parallel arc faults, which peaks remain relatively constant. The constant peak current behavior of arc faults allows discrimination from phase controllers, such as light dimmers, which are the only type of common load which will have high 60 Hz peak currents associated with di/dt.

The sensing of 60 Hz arc fault voltage across buss bar 35, which is directly proportional to the protected line current, is much easier than recovering the 60 Hz signal from the output of sensor 2, as the buss bar voltage is developed across simple linear resistance, and is not greater for the di/dt of the arc fault steps than for the sinusoidal 60 Hz arc fault current component, which happens with the output from sensor 2. This eliminates the need for complicated di/dt stripping filters when recovering the 60 Hz component from the output of sensor 2. Using buss bar 35 as a sensor requires one side of the buss bar sensor, and therefore one of the power lines, to be circuit common.

The signal across buss bar 35, after low pass filtering by a filter 34 to eliminate high frequency signals, is split into two paths. The first path is connected to a comparator 36 whose output is connected as an input 19 to microprocessor 18. This output causes microprocessor 18 to shift to the alternate speedy algorithm. In the speedy algorithm, microprocessor 18 counts pulse transitions arriving from the output of comparator 16, corresponding to the di/dt of the arc fault, and ignores other arc fault signature components, issuing a trip signal to SCR 38 only if the di/dt pulse count reaches a first predetermined number before a second predetermined number of peak current detection pulses arrive at input 19 of microprocessor 18 from comparator 36.

Figure 2:
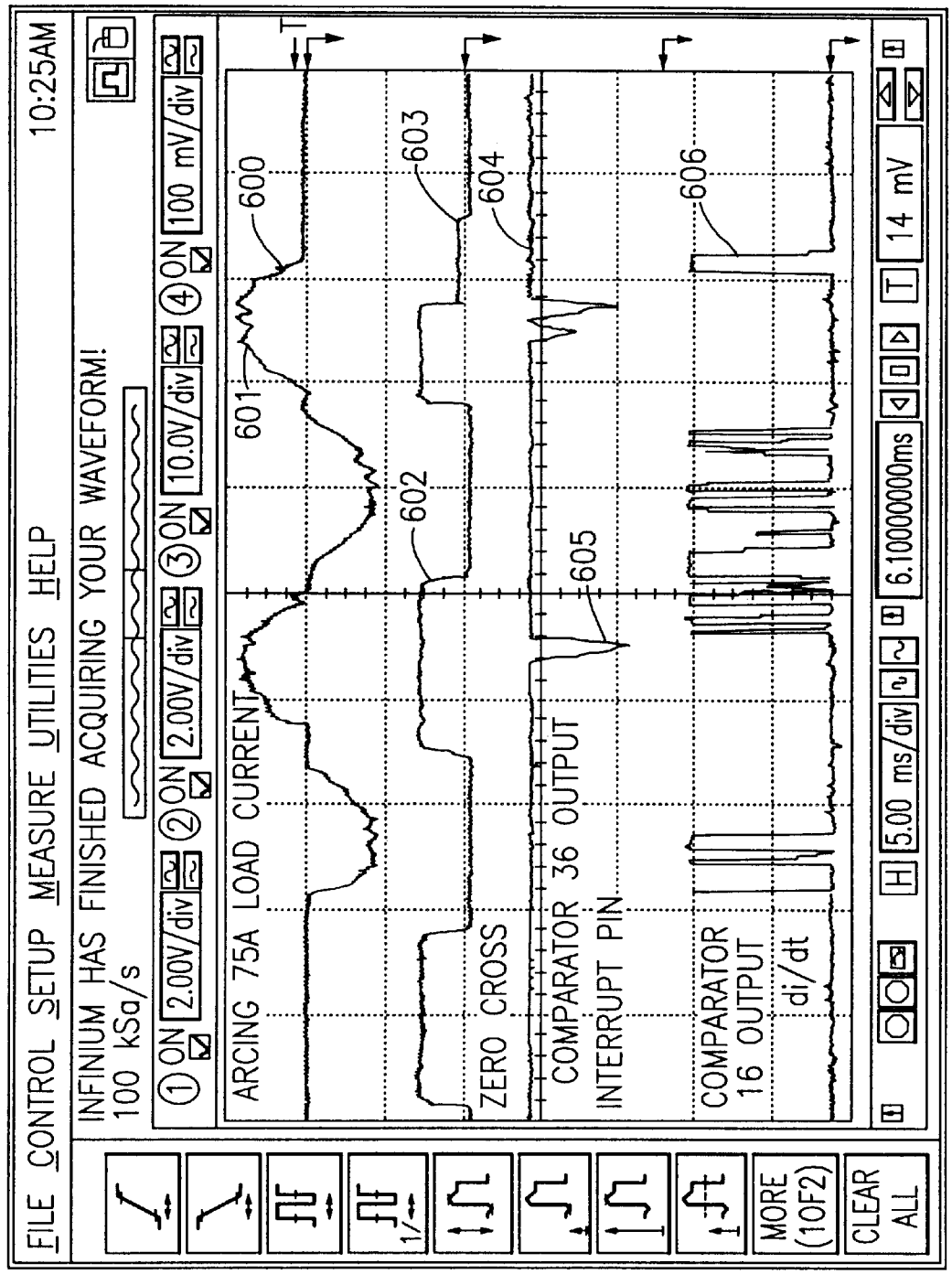
FIG. 2 shows various waveforms used in explaining the circuit of FIG. 1.

Referring to FIG. 2, a waveform 600 is the arcing load current, a waveform 602 is the zero cross signal to microprocessor 18 at input 21 from a voltage zero cross detector 23, a waveform 604 is the comparator 36 output to input 19 of microprocessor 18, and a waveform 606 is the di/dt caused pulse from comparator 16 on input 17 to microprocessor 18. The peaks on waveform 600, such as a peak 601, produce the negative going pulses on waveform 604, such as a pulse 605. These pulses 605 cause microprocessor 18 to shift to the speedy algorithm.

Waveform 606 shows that, between the pulses of the comparator 36 output in waveform 604, which pulses indicate a high level of continuous peak arc current, a number N of di/dt pulses occur on waveform 606, indicating an arc fault, whereupon SCR 38 is activated, interrupting the load, as indicated by the drop in the zero cross pulse voltage at point 603. Alternatively, the total number of di/dt pulses on waveform 606 are counted for a specified number of half cycles, with SCR 38 being activated by microprocessor if the total number of di/dt pulses exceeds a predetermined number. The problem is that we can't simply count the number of di/dt pulses that occur within the first half cycle of arcing, since non-fault arcing can be caused by a number of different devices, including switches, dimmers, etc. Waiting until after the sixth half cycle to compare the total number of di/dt pulses avoids false tripping while still interrupting the circuit in a timely fashion when a real arc fault occurs. The number N can be determined by one skilled in the art by routine experimentation.

In the preferable speedy algorithm, microprocessor 18 opens a detection window W for a predetermined number of half wave cycles, as determined from zero cross pulse train 602 arriving from zero cross detector 23 at microprocessor input 21. During the open detection window, microprocessor 18 starts counting the pulses 605 arriving at input 19 corresponding to sustained 60 Hz current above the preferred limit of 50 A, while at the same time, based on input 17, starts counting any di/dt pulses caused by any steps in the current flowing in the protected downstream line(s) from arcing, arriving from the comparator 16 output as shown on waveform 606 of FIG. 2. Microprocessor 18 preferably processes the di/dt pulses in the several ways, or combination of ways, as follows.

1) Ignore the di/dt pulses that occur for a first predetermined time T or a first predetermined number of half wave cycles L associated with switch transient di/dt or dimmer inrush di/dt, then start counting the di/dt until a predetermined number N of the 60 Hz peak current associated pulses P have occurred at microprocesor 18 input 19, indicating sustained peak 60 Hz current, then determine if the di/dt count M is at or above a first predetermined number associated with arcing. If it is, then trip the AFCI.

2) If the di/dt count M is at or above a second predetermined number between any of a succession of 60 Hz current associated pulses P, during a window of half wave pulses W, then trip the AFCI.

3) The same as the method of (2) above, but only after the time T or number of half wave cycles L has occurred.

4) For the window W, and after each pulse P, only count di/dt during a predetermined interval of time at the end of the half wave associated with arc extinguish di/dt pulses, and trip the AFCI if a di/dt count M has occurred in a N count of pulses P.

5) The same as the method of (4) above, but only after the time T or number of half wave cycles L has occurred.

Although comparator 36 only responds to positive peaks of the line current, a second comparator which responds to the negative half cycle peaks of the line current could be added to the circuit of FIG. 1 and OR'ed with the output of comparator 36 to provide pulses to microprocessor 18 input 19 at each positive and negative half wave line current peak which exceeds a predetermined level. Microprocessor 18 would still process the pulses P now arriving every half cycle in the same way as methods 1–5 above, but in a faster way.

Referring back to FIG. 1, the second path for the signal across buss bar 35 is the input of a comparator 33 whose output is set to switch high when the voltage across buss bar 35 corresponds to a second predetermined high fault current, preferably 150 A. The output of comparator 33 is directly connected to the gate of SCR 38 and causes SCR 38 to trip out the device regardless of microprocessor 18 activity. This second path action protects the AFCI from damage due to prolonged overcurrent.

Figure 3:
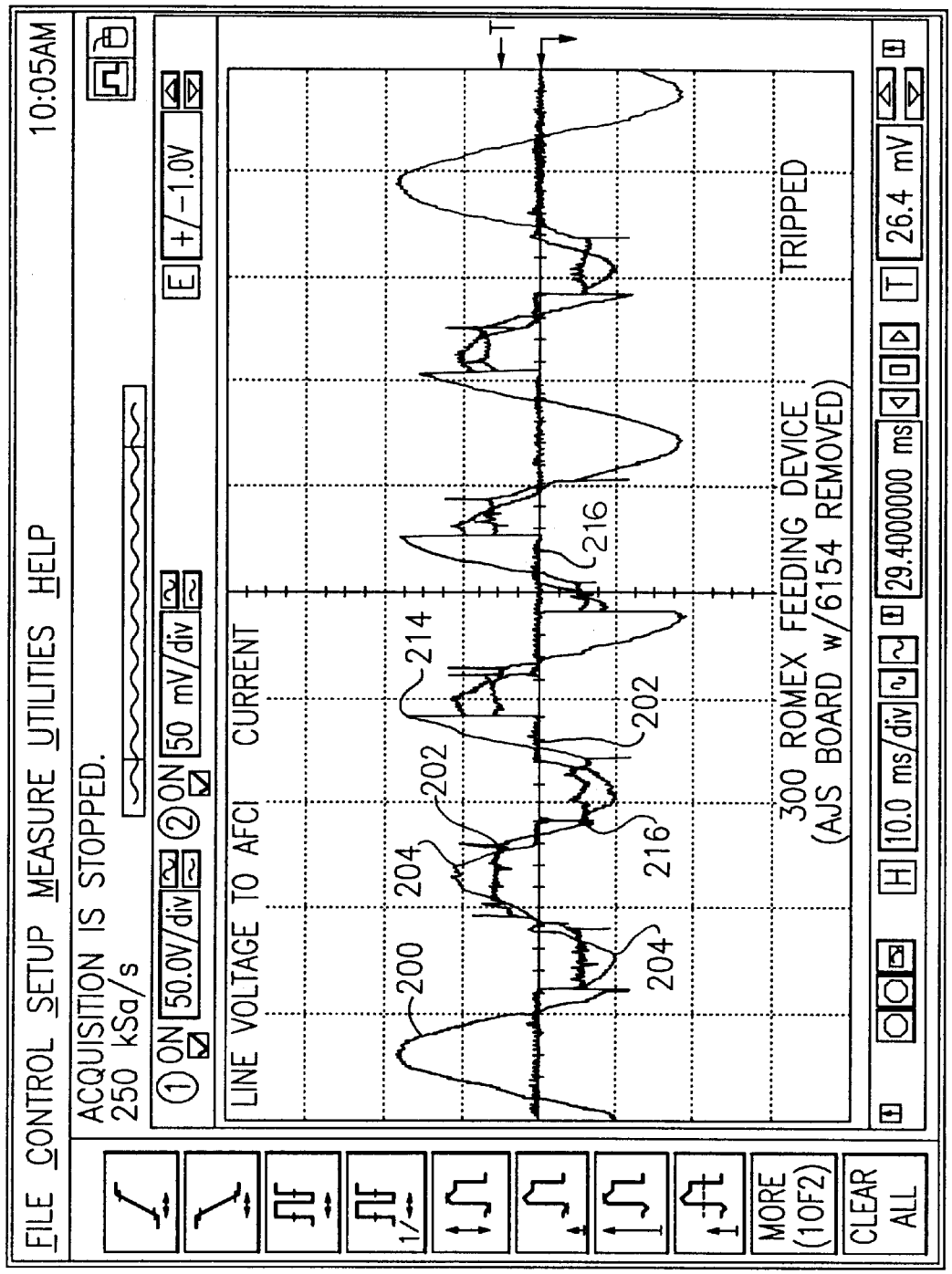
FIG. 3 shows various waveforms used in explaining the circuit of FIG. 1.

Referring to FIGS. 1 and 3, upstream parallel arc events, such as a tree limb falling across street pole wires, are sensed in order to turn microprocessor 18 off for the duration of the upstream parallel arc event, during which time protection is provided by the circuit breaker on the AC power lines. There are two reasons why we don't want to respond to upstream parallel arcing events. First, we don't want to trip on upstream arcing, since tripping only disconnects the load, which has no effect on a parallel arc event. Second, once the voltage in the AFCI circuit drops to below about 2 volts, microprocessor 18 operates intermittently and/or erratically, frequently resulting in tripping the load when not desired.

An upstream parallel arc fault event causes a resulting line voltage shown as a waveform 200 at the input to the AFCI, which shows the line voltage dropping down to the voltage across the arc at a voltage flat 202. For a 115/120 Volt electric distribution system, the voltage at voltage flat 202 is about 40 Volts. A current waveform 204 flats out at the zero crossing as shown at 216. When the current is zero, it lets the voltage rise, resulting in the characteristic voltage spike shown, e.g., at a point 214. The voltage spike 214 followed by the voltage flat 202 is characteristic of upstream parallel arcing where the line voltage can only recover after the arc has extinguished.

Figure 4:
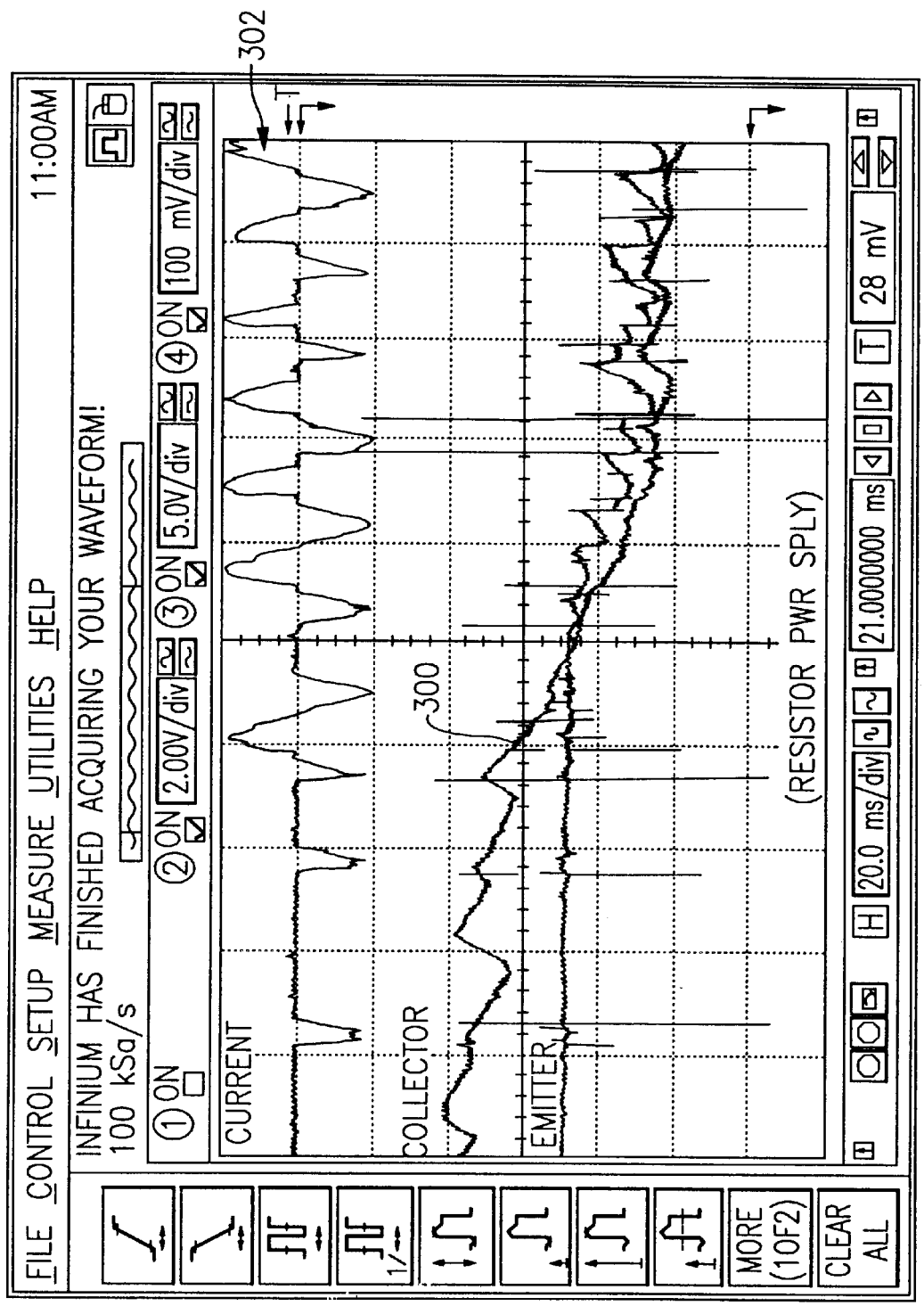
FIG. 4 shows various waveforms used in explaining the circuit of FIG. 1.

Referring also to FIG. 4, a voltage waveform 300, taken at a regulation capacitor 54 in a DC power supply 52 during upstream parallel arcing, shows the DC supply of the AFCI dropping to a low voltage because of the line voltage dropping to the level as shown by voltage flat 202 in FIG. 3. It is this effect that is used to determine an upstream parallel arc fault as follows.

Referring back to FIG. 1, a comparator block 40 acts as a low DC power supply, lightning surge detector, and power line brownout detector. DC supply 52 is preferably a conventional series pass DC regulator for the AFCI electronics. Comparator block 40 samples the DC supply 52 voltage across regulation capacitor 54 via a voltage divider 44 and shifts a comparator 41 output low if the power supply falls to a predetermined value, as set by a divider 42, which is preferably set just above the DC supply voltage. In this manner, a decreasing voltage on capacitor 54 is identified before there is a loss of voltage at the output of the DC supply which would cause the microprocessor 18 to become unstable. When the comparator 41 output shifts low, a time delay capacitor 62 of a time delay 60 is discharged rapidly through a diode 64. Capacitor 62 is connected to the microprocessor 18 reset input 61 causing microprocessor 18 to reset as long as that input is low. The time delay of time delay 60 is set for a predetermined time interval associated with short duration power line brownouts. Without the low DC supply sensing circuit, a brownout or parallel upstream arc fault event could cause microprocessor 18 to become unstable on the corresponding low DC supply voltage and cause a false activation of the AFCI.

In an alternative embodiment, the input voltage to the AFCI is fed via a voltage divider (not shown) to an analog to digital converter (ADC, also not shown), with the ADC output fed to microprocessor 18. When microprocessor 18 detects that the voltage has fallen below a predetermined value, such as 40 Volts for a 115/120 Volt electric distribution system, microprocessor 18 sends no trip signal.

Comparator block 40 is preferably connected to a surge detector circuit 70, which detects line voltage surges above a predetermined limit. When a voltage surge occurs above the predetermined limit, a MOV 72 conducts current from the hot line through a limit resistor 74 and a blocking diode 76 charging a capacitor 80 to a logic voltage level during the brief pulse of a positive going voltage surge. A Zener 19 clamps the charge voltage of capacitor 80 to the logic voltage level. The charge voltage across capacitor 80, resulting from the surge, is connected to comparator block 40 at the center of resistor divider 42. The surge voltage across capacitor 80 acts to switch comparator 41 to the low state, causing microprocessor 18 to be reset for the duration of time delay circuit 60 plus the delay time it takes for capacitor 80 to discharge through the resistor divider 42.

This action shuts off microprocessor 18 for surges that may be caused by lightning strikes which may produce many arc fault mimicking currents that would false trip the AFCI. During minus going lightning surges, surge current passes from the neutral wire up through a diode 82, a blocking diode 84, a limit resistor 74, and returns to the hot line through MOV 72. This action pulls the cathode of diode 82 to approximately 0.7V above the neutral wire circuit reference. The cathode of diode 82 is also connected to a reset pin 61 of microprocessor 18. A negative going surge causes conducting diode 82 to sink reset pin 61 and reset microprocessor 18 with the benefit of avoiding nuisance tripping as described above. The reset period is set by time delay 60 once the surge has passed. A MOV 86 is also preferably included as a surge protector for the AFCI electronics and is set at a higher breakover voltage than MOV 72.

A filter 90 acts to decouple the AFCI from upstream arc mimicking noise. Filter 90 component values are approximately an inductor 92 of 30 µH, a capacitor 94 at 0.1 µF, and a fuse resistor 96, which fuses on a shorted capacitor 94, of 1 ohm. Surge circuit 70 and MOV 86 also act to protect capacitor 94. Capacitor 94 also acts as a local current supply for the di/dt of downstream arcing and provides for a stable current source in which to calibrate di/dt processing circuit 4. Filter 90 is not required, as the AFCI without the filter gives good performance in noise rejection and arc detection, but may be required in locations which have abnormal levels of power line arc mimicking noise.

Figure 5A:
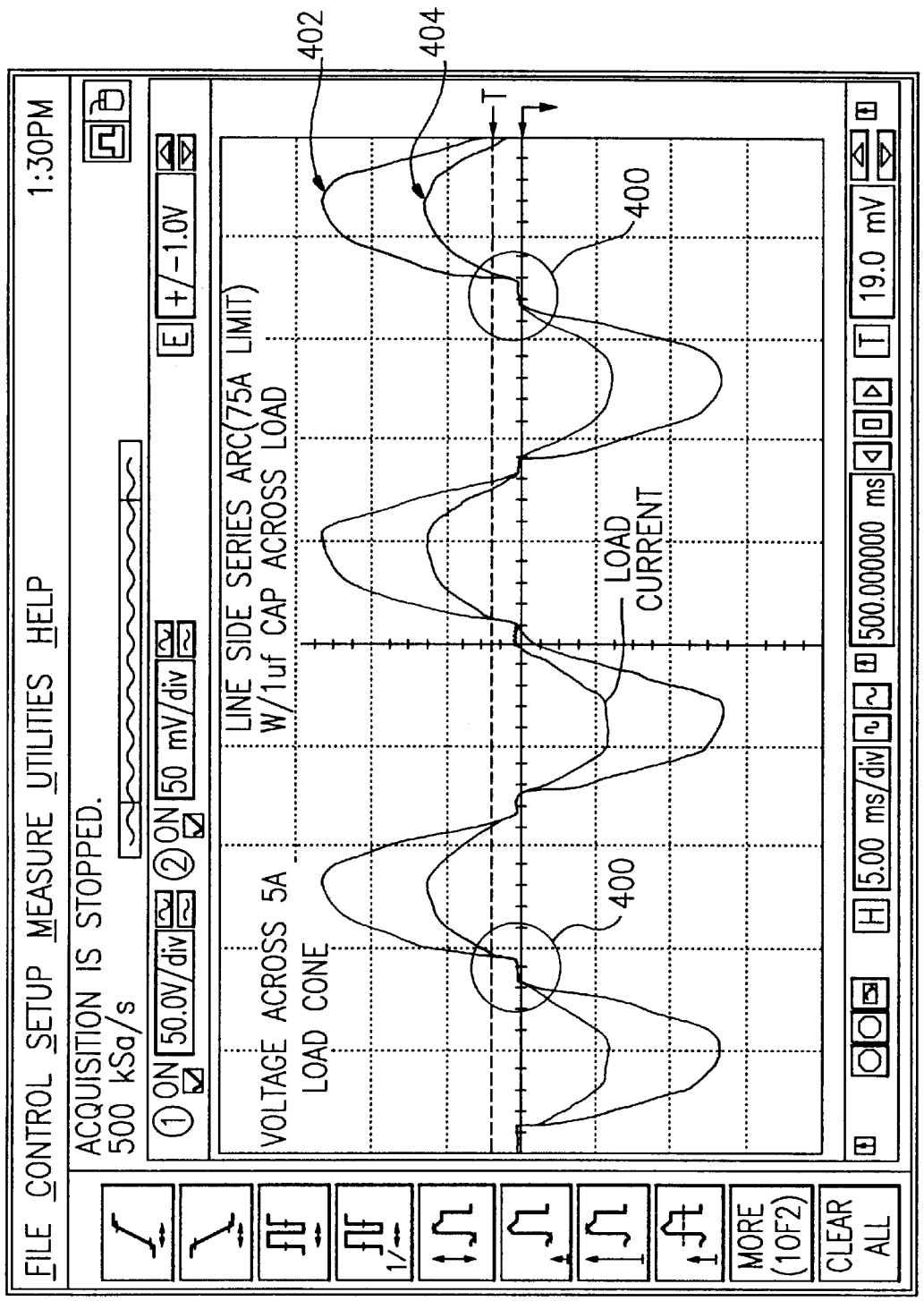
FIG. 5A shows various waveforms used in explaining the circuit of FIG. 1.
Figure 5B:
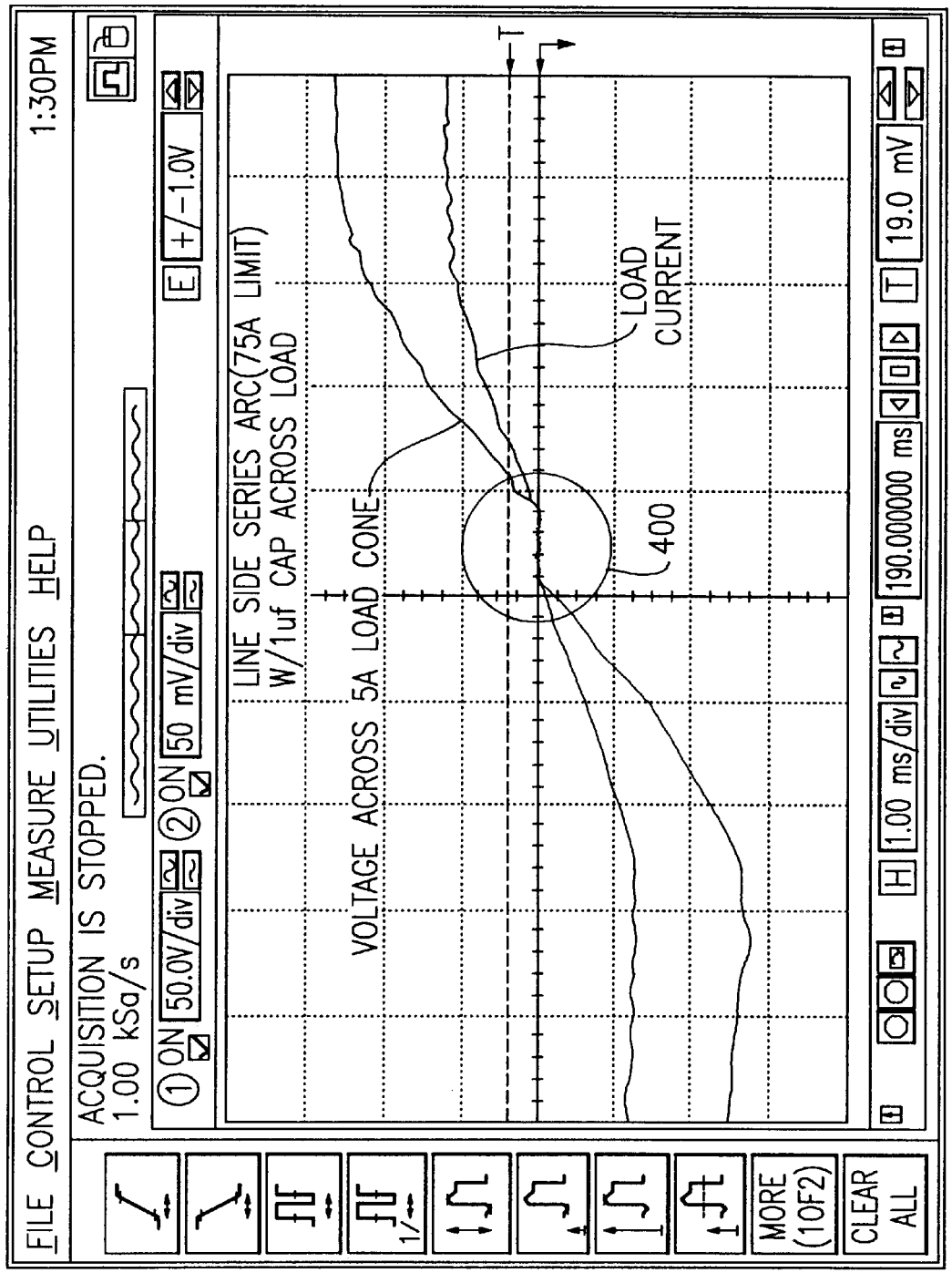
FIG. 5B shows various waveforms used in explaining the circuit of FIG. 1.

Upstream (line side) series arcing is detected by analyzing the zero cross pulse width arriving at input 21 to microprocessor 18 from zero cross circuit 23 which is connected to the line hot through solenoid 210. As depicted in FIGS. 5A and 5B, a line voltage waveform 402 across the AFCI and a current waveform 404 through the AFCI for line side series arcing are shown. A point 400 shows the unusual signature event where both the current waveform 404 and the line voltage 402 waveform collapse to zero as the series upstream arc opens and closes the line connection to the AFCI. Although the current flats shown also occur with series downstream arcs, the voltage flats only occur with series upstream arcs.

Figure 6:
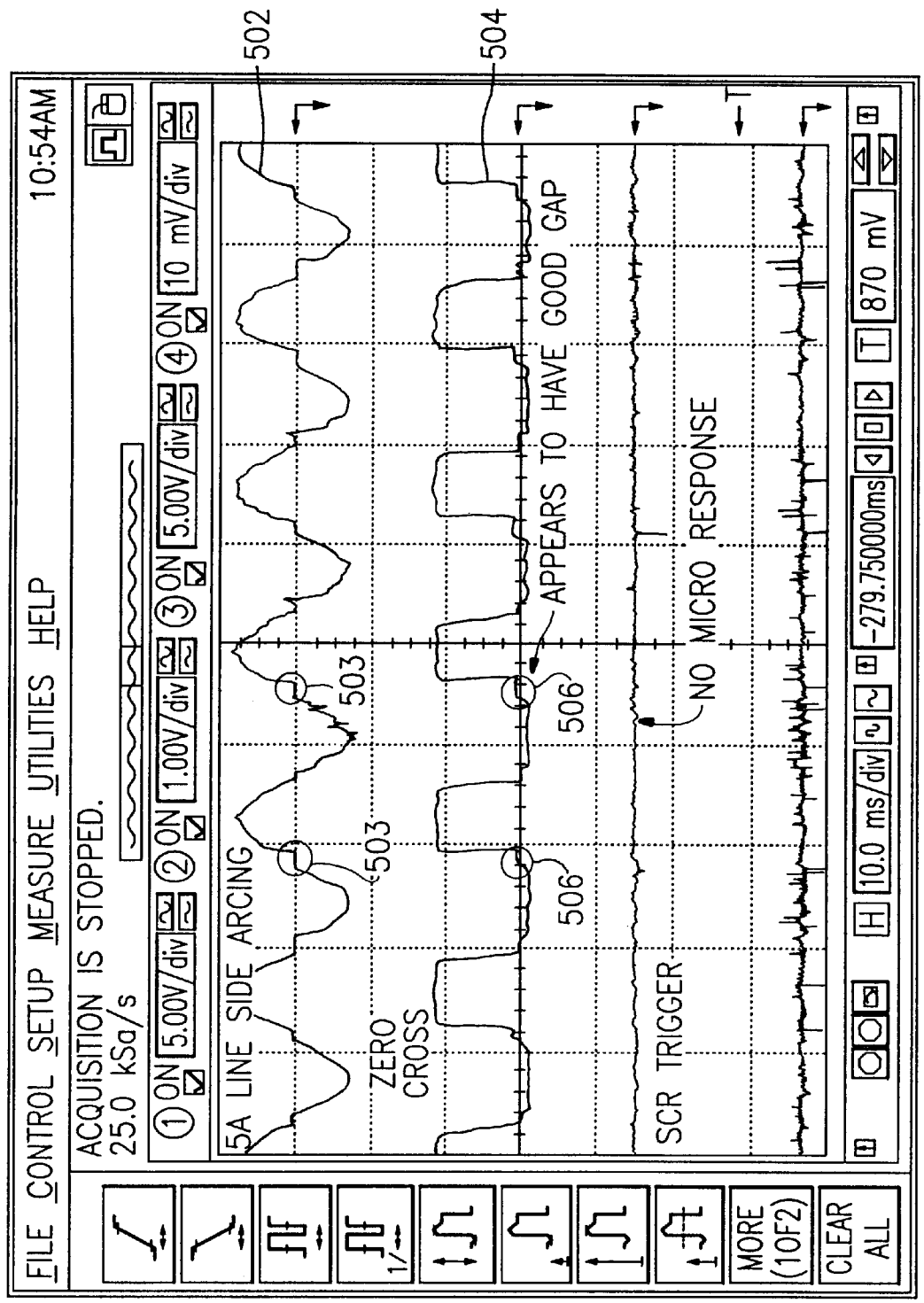
FIG. 6 shows various waveforms used in explaining the circuit of FIG. 1.

Referring to FIG. 6, a zero cross signal 504 is shown arriving at microprocessor input 21 during an upstream series arc. A current waveform 502 is shown for the voltage waveform of signal 504. Signal 504 shows a plurality of flats 506 occurring in the zero cross pulse during series current upstream line arcs shown at a location 503 on current waveform 502. Microprocessor 18 constantly measures the zero cross pulse width and compares it to a constant. If the width varies by a predetermined amount from a constant number, stored in microprocessor 18, for N out of M line cycles, then microprocessor 18 issues a trip signal to SCR 38. An alternate software routine can be invoked which not only must have N out M zero cross pulse width reductions, caused by the upstream series arcing, but which must also count L number of di/dt transitions at an input 17 to microprocessor 18 during the M period before a SCR 38 trip command is issued. This offers a second barrier to nuisance tripping which may result from zero cross pulse width reductions occurring from other sources than upstream series arcing.

The microprocessor 18 software algorithm for detecting low level series arcs and parallel arcs is described in U.S. patent application Ser. No. 09/788,206 referred to above.

Referring back to FIG. 1, an embodiment is shown which preferably includes a status detector circuit 204 for contacts 212. Circuit 204 preferably includes a dropping resistor 206 and a Zener clamp 208 which lower the line voltage to a logic level. When contacts 212 are open, circuit 204 deactivates an input 25 to microprocessor 18, putting microprocessor 18 in a sleep mode which acts to prevent any arc mimicking noise from causing microprocessor 18 to issue false trip commands to SCR 38. Circuit 204 also acts to detect the failure of contacts 212 to open on a trip command, and can be used to activate a fault indicator light, or an alarm, or to cause microprocessor 18 to periodically activate SCR 38, and subsequently solenoid 210, which causes a fault indication chattering noise of the solenoid plunger.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An arc fault circuit interrupter operatively connected between a line side and a load side of an AC electric power distribution system, comprising:

first sensing means for sensing a line current in said AC electric power distribution system and producing a di/dt signal;

circuit means for processing said di/dt signal and producing an output;

tripping means for interrupting power to said load;

processing means for processing said output to determine an existence of a downstream arc fault, said processing means including a normal algorithm and a speedy algorithm for processing said output, said processing means sending a trip signal to said tripping means upon determination of said downstream arc fault;

second sensing means for sensing a sinusoidal load current of a fundamental frequency of said power distribution system above a first predetermined level;

circuit means, responsive to said second sensing means, for initiating said speedy algorithm within said processing means;

circuit means for detecting an existence of an upstream series arc, and upon detection of said upstream series arc, for signaling said processing means to send said trip signal to said tripping means; and circuit means for detecting an existence of an upstream parallel arc, and upon detection of said upstream parallel arc, for deactivating said processing means so that said processing means does not send said trip signal to said tripping means.

2. An arc fault circuit interrupter according to claim 1, further comprising circuit means for detecting an upstream surge voltage, which upon detection of said upstream surge voltage signals said processing means so that said processing means does not send said trip signal to said tripping means.

3. An arc fault circuit interrupter according to claim 1, further comprising circuit means for detecting an upstream brownout voltage, which upon detection of said upstream brownout voltage signals said processing means so that said processing means does not send said trip signal to said tripping means.

4. An arc fault circuit interrupter according to claim 1, wherein said circuit means for detecting an existence of an upstream parallel arc also detects an upstream brownout voltage, which upon detection of one of said upstream brownout voltage and said upstream parallel arc, signals said processing means so that said processing means does not send said trip signal to said tripping means.

5. An arc fault circuit interrupter according to claim 4, wherein, when said brownout voltage ceases by increasing in amplitude, said circuit means for detecting an existence of an upstream parallel arc does not signal said processing means to send said trip signal.

6. An arc fault circuit interrupter according to claim 1, further comprising third sensing means for sensing said sinusoidal load current of said fundamental frequency above a second predetermined level, which upon sensing said load current above said second predetermined level, activates said tripping means without signaling said processing means.

7. An arc fault circuit interrupter according to claim 1, further comprising circuit means for detecting a status of said tripping means, which upon detection that said tripping means has interrupted power to said load, sends a signal deactivating said processing means until said tripping means no longer interrupts power to said load.

8. An arc fault circuit interrupter according to claim 1, further comprising circuit means for blocking upstream noise which mimics a signature of arc faults in said load side of said AC power distribution system.

9. An arc fault circuit interrupter according to claim 8, wherein said circuit means for blocking noise consists of a passive filter.

10. An arc fault circuit interrupter according to claim 1, wherein said circuit means for processing said di/dt output further comprises a high pass filter having a break frequency wherein said break frequency rejects signals associated with power line converters below about 50 KHz.

11. An arc fault circuit interrupter according to claim 1, wherein said circuit means for processing said di/dt output further comprises blocking means for blocking di/dt pulses which exceed a predetermined magnitude substantially associated with nonarcing inrush events.

12. An arc fault circuit interrupter according to claim 11, wherein said blocking means presents a high impedance to said first sensing means.

13. An arc fault circuit interrupter according to claim 1, wherein said second sensing means includes a shunt resistance in series with said line current sensed by said first sensing means.

14. An arc fault circuit interrupter according to claim 1, wherein said first sensing means includes a line current sensor transformer having the line as a primary winding and having a secondary winding connected to a Zener diode, said Zener diode being connected to said tripping means, in which sensed ground fault current by said first sensing means produces a signal which breaks over said Zener diode which in turn activates said tripping means.

15. An arc fault circuit interrupter operatively connected between a line side and a load side of an AC electric power distribution system, comprising:

tripping means for interrupting power to said load;

first sensing means for sensing upstream arc faults in said AC electric power distribution system and producing an output;

processing means for processing said output to determine an existence of a downstream arc fault, said processing means sending a trip signal to said tripping means upon determination of said downstream arc fault;

first circuit means for detecting an existence of an upstream series arc, and upon detection of said upstream series arc, for signaling said processing means to trip said tripping means; and second circuit means for detecting an existence of an upstream parallel arc, and upon detection of said upstream parallel arc, for deactivating said processing means so that said processing means does not send said trip signal to said tripping means.

16. An arc fault circuit interrupter according to claim 15, wherein said first sensing means senses line voltage in said AC electric power distribution system proximate said arc fault circuit interrupter.

17. An arc fault circuit interrupter according to claim 16, wherein said first sensing means includes a shunt resistance in series with said line current.

18. An arc fault circuit interrupter according to claim 15, further comprising:

second sensing means for sensing downstream arc faults in said AC electric distribution system; and third circuit means for detecting an existence of downstream series and parallel arcs, and upon detection of said downstream arc, for signaling said processing means to trip said tripping means.

19. An arc fault circuit interrupter according to claim 18, wherein said second sensing means senses line current in said AC electric power distribution system and produces a di/dt signal responsive to said arc fault.

20. An arc fault circuit interrupter according to claim 19, wherein said second sensing means is a toroidal transformer.

21. An arc fault circuit interrupter according to claim 18, wherein said third circuit means includes a high pass filter having a break frequency of about 50 kHz.

22. An arc fault circuit interrupter according to claim 15, further comprising:

DC power supply means for providing a prerequisite voltage for operation of said first and second circuit means and said processing means;

said second circuit means including voltage loss detection means for early detection of said existence of said upstream parallel arc; and said voltage loss detection means deactivating said processing means before said DC power supply means fails to supply said prerequisite voltage, thereby assuring said processing does not signal said tripping means to trip.

23. An arc fault circuit interrupter according to claim 15, further comprising second sensing means for establishing that a fundamental frequency of a load current of said AC electric power distribution system is above a predetermined level, which upon sensing said load current being above said predetermined level, activates said tripping means without signaling said processing means.

24. An arc fault circuit interrupter according to claim 23, wherein said second sensing means is a line current sensor transformer having the line as a primary winding and having a secondary winding connected to a Zener diode, said Zener diode being connected to said tripping means, in which sensed ground fault current by said first sensing means produces a signal which breaks over said Zener diode which in turn activates said tripping means.

25. An arc fault circuit interrupter according to claim 15, further comprising circuit means for detecting a status of said tripping means, which upon detection that said tripping means has interrupted power to said load, sends a signal deactivating said processing means until said tripping means no longer interrupts power to said load.

26. An arc fault circuit interrupter operatively connected between a line side and a load side of an AC electrical power distribution system, comprising:
  tripping means for interrupting power to said load;
  sensing means for sensing arc faults in said AC electrical power distribution system and producing an output;
  processing means for processing said output to determine an existence of a downstream arc fault, said processing means sending a trip signal to said tripping means upon determination of said downstream arc fault;
  first circuit means for detecting an existence of an arc fault signal, and upon detection of said arc fault signal, for signaling said processing means to trip said tripping means; and
  second circuit means for detecting an existence of upstream arc mimicking noise, and upon detection of said upstream arc mimicking noise, for deactivating said processing means so that said processing means does not send a trip signal to said tripping means.

27. An arc fault circuit interrupter according to claim 26, wherein said arc mimicking noise comprises an upstream voltage surge condition.

28. An arc fault circuit interrupter according to claim 27, wherein said voltage surge condition is detected by a voltage on a semiconductor exceeding a barrier voltage and a current passing therethrough.

29. An arc fault circuit interrupter according to claim 28 wherein said voltage surge condition is detected by a metal oxide varistor.

30. An arc fault circuit interrupter according to claim 27, further comprising voltage surge detection circuitry, wherein said processing means includes a reset terminal, said voltage surge detection circuitry imposing a reset condition on said processing means for a predetermined interval exceeding a predetermined probable duration of said voltage surge condition.

31. An arc fault circuit interrupter according to claim 26 wherein said first circuit means is not responsive to upstream parallel arc faults.

32. An arc fault circuit interrupter according to claim 26 wherein said arc mimicking.

33. An arc fault circuit interrupter according to claim 32, further comprising:
  DC power supply means for providing a prerequisite voltage for operation of said first and second circuit means and said processing means;
  voltage loss detection means for early detection of said voltage brownout condition; and
  said voltage loss detection means deactivating said processing means before said DC power supply fails to supply said prerequisite voltage, thereby assuring said processing means does not signal said tripping means to trip.

34. An arc fault circuit interrupter according to claim 33, wherein, when a voltage associated with said voltage brownout condition increases in amplitude such that said voltage brownout condition ceases, said first circuit means does not signal said processing means to send said trip signal.

35. An arc fault circuit interrupter according to claim 23, wherein said processing means includes a reset terminal, said voltage loss detection means imposing a reset condition on said processing means for a predetermined interval exceeding a predetermined probable duration of said voltage brownout condition.

36. An arc fault circuit interrupter operatively connected between a line side and a load side of an AC electric power distribution system, comprising:
  tripping means for interrupting power to said load;
  sensing means for sensing arc faults in said AC electric power distribution system and producing an output;
  processing means for processing said output to determine an existence of a downstream arc fault, said processing means sending a trip signal to said tripping means upon determination of said downstream arc fault;
  first circuit means for detecting an existence of arc fault signal, and upon detection of said arc fault signal, for signaling said processing means to trip said tripping means; and
  filter means located upstream of said sensing means; wherein said filter means prevents arc mimicking noise on said AC electric power distribution system from signaling s aid processing means to trip said tripping means.

37. An arc fault circuit interrupter according to claim 36 further comprising a housing, all components of said arc fault circuit interrupter being contained therein.

38. An arc fault circuit interrupter according to claim 37 wherein said housing is a receptacle.

39. An arc fault circuit interrupter according to claim 36 where in s aid filter means comprises:
  an inductor in series with said line; and
  a downstream impedance containing capacitance in parallel with said AC electric power.

40. An arc fault circuit interrupter according to claim 36, further comprising circuit means for detecting an existence of an upstream series arc, and upon detection of said upstream series arc, for signaling said processing means to trip said tripping means.

41. An arc fault circuit interrupter according to claim 40, further comprising circuit means for detecting an existence of an upstream parallel arc, and upon detection of said upstream parallel arc, for deactivating said processing means so that said processing means does not send said trip signal to said tripping means.

42. An arc fault circuit interrupter according to claim 41, wherein said means for detecting an existence of an upstream parallel arc includes means for detecting an input voltage level to said arc fault circuit interrupter and means for converting said input voltage level to a digital signal, wherein said digital signal deactivates said processing means.

43. An arc fault circuit interrupter operatively connected between a line side and a load side of an AC electric power distribution system, comprising:

tripping means for interrupting power to said load;

first sensing means for sensing a line current in said AC electric power distribution system and producing a di/dt signal;

circuit means for processing said di/dt signal and producing an output;

processing means for processing said output to determine an existence of a downstream arc fault, said processing means including a normal algorithm and a speedy algorithm for processing said output, said processing means sending a trip signal to said tripping means upon determination of said downstream arc fault;

second sensing means for sensing a sinusoidal load current of a fundamental frequency of said power distribution system above a first predetermined level; and circuit means, responsive to said second sensing means for initiating said speedy algorithm within said processing means when said first predetermined level is exceeded for a predetermined interval, wherein said second sensing means includes a shunt resistance in series with said line.

44. An arc fault circuit interrupter according to claim 43, wherein said first sensing means is a line current sensor transformer having the line as a primary winding and having a secondary winding connected to a Zener diode, said Zener diode being connected to said tripping means, in which sensed ground fault current by said first sensing means produces a signal which breaks over said Zener diode which in turn activates said tripping means, without signaling said processing means.

45. An arc fault circuit interrupter operatively connected between a line side and a load side of an AC electric power distribution system, comprising:

tripping means for interrupting power to said load;

sensing means for sensing a ground fault current in said AC electric power distribution system;

where in said sensor is connected to a Zener diode, said Zener diode being connected to said tripping means, in which sensed ground fault current by said first sensing means produces a signal which breaks over said Zener diode which in turn activates said tripping means.

46. An arc fault circuit interrupter according to claim 45 in which said sensor is a toroidal transformer in which the line is a primary winding and said Zener diode is connected to a secondary winding.

47. An arc fault circuit interrupter operatively connected between a line side and a load side of an AC electric power distribution system, comprising:

tripping means for interrupting power to said load;

sensing means for sensing a line current in said AC electric power distribution system, said sensing means including a toroidal transformer in which the line is a primary winding and a secondary winding produces a di/dt signal;

circuit means for processing said di/dt signal and producing an output;

processing means for processing said output to send a trip signal to said tripping means upon detection of said di/dt signal;

circuit means for determining a magnitude of said di/dt signal; and high impedance means responsive to said magnitude, wherein a plurality of di/dt signals greater than a pre-established threshold cause said high impedance means to open, thereby blocking said plurality of di/dt signals from said processing means, and unloading said secondary winding of said sensor.

48. An arc fault circuit interrupter according to claim 47 wherein said high impedance means includes an FET.

* * * * *

UNITED STATES PATENT AND TRADEMARK OFFICE
CERTIFICATE OF CORRECTION

PATENT NO.    : 6,504,692 B1                                        Page 1 of 1
DATED         : January 7, 2003
INVENTOR(S)   : Bruce F. Macbeth et al.

It is certified that error appears in the above-identified patent and that said Letters Patent is hereby corrected as shown below:

<u>Column 13,</u>
Line 62, after the word "mimicking" please delete the "." and add the missing text
-- noise comprises and upstream voltage brownout condition. --

Signed and Sealed this

Thirteenth Day of May, 2003

JAMES E. ROGAN
*Director of the United States Patent and Trademark Office*